March 9, 1937.  G. A. BROOKE, JR  2,073,332
COMPENSATED CONTROL SYSTEM
Filed June 13, 1936   3 Sheets-Sheet 1
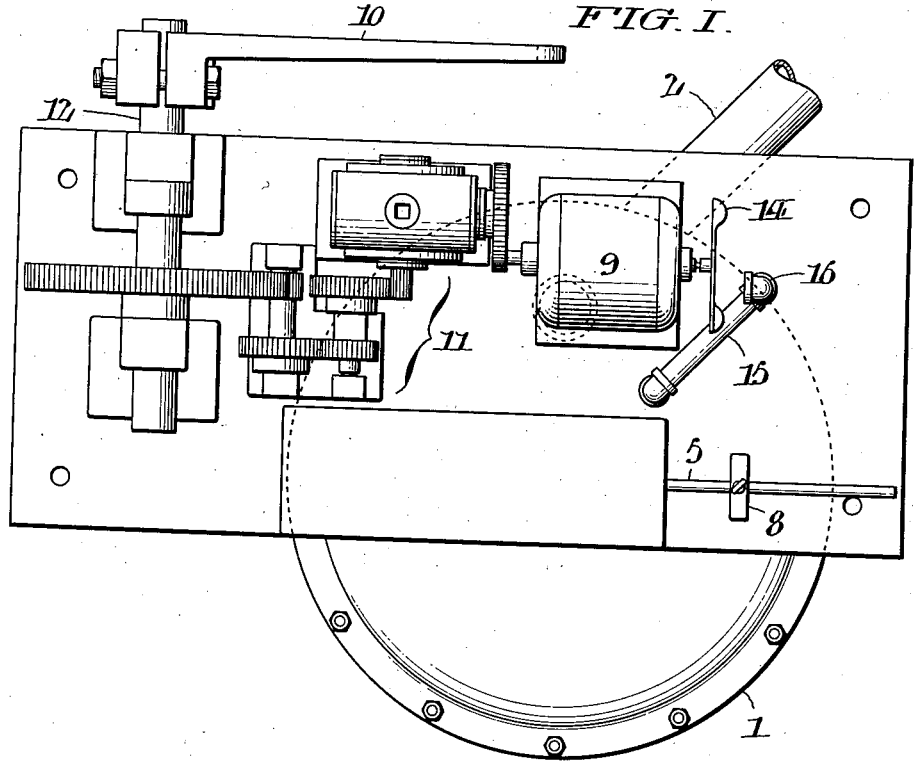
FIG. I.
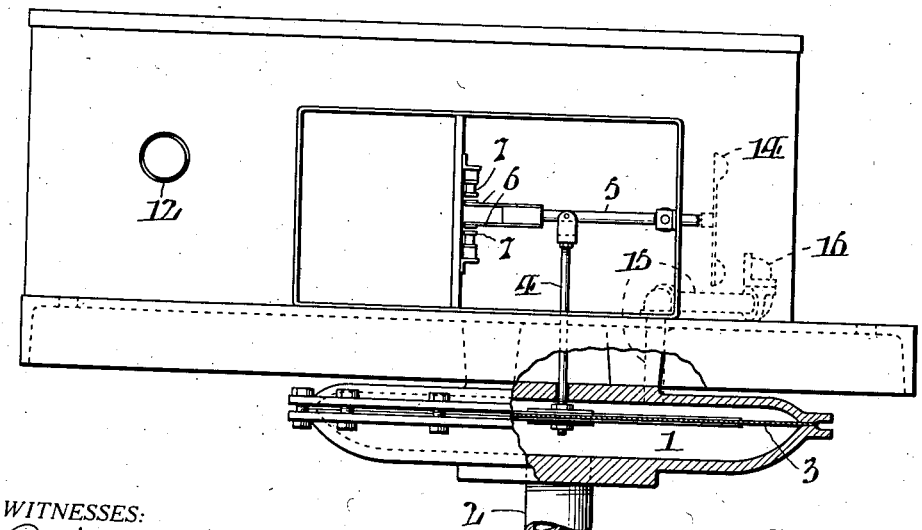
FIG. II.
WITNESSES:
Thomas W. Kerr, Jr.
John A. Weidler
INVENTOR:
George A. Brooke, Jr.,
BY Fraley Paul
ATTORNEYS.

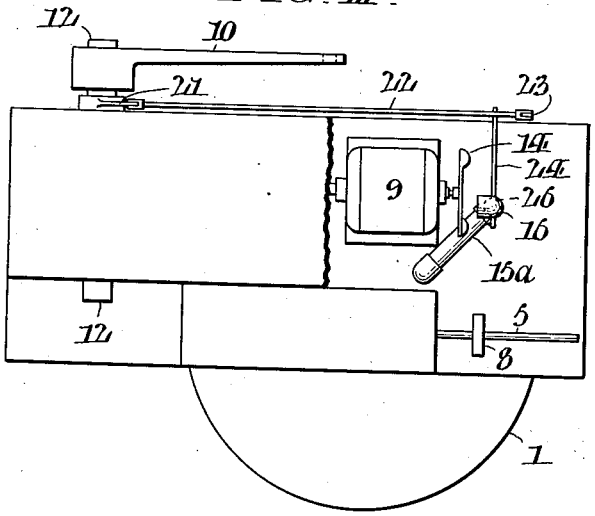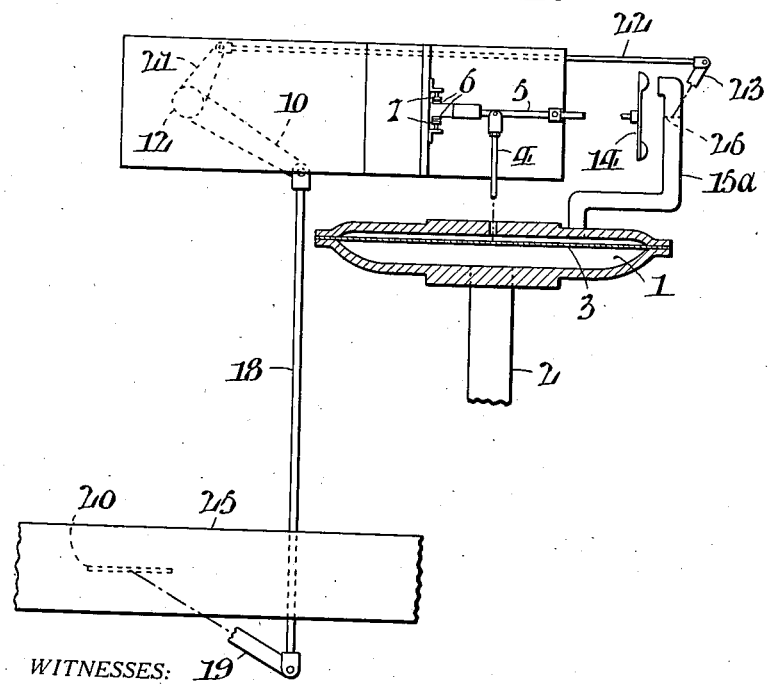

March 9, 1937.  G. A. BROOKE, JR  2,073,332
COMPENSATED CONTROL SYSTEM
Filed June 13, 1936  3 Sheets-Sheet 3
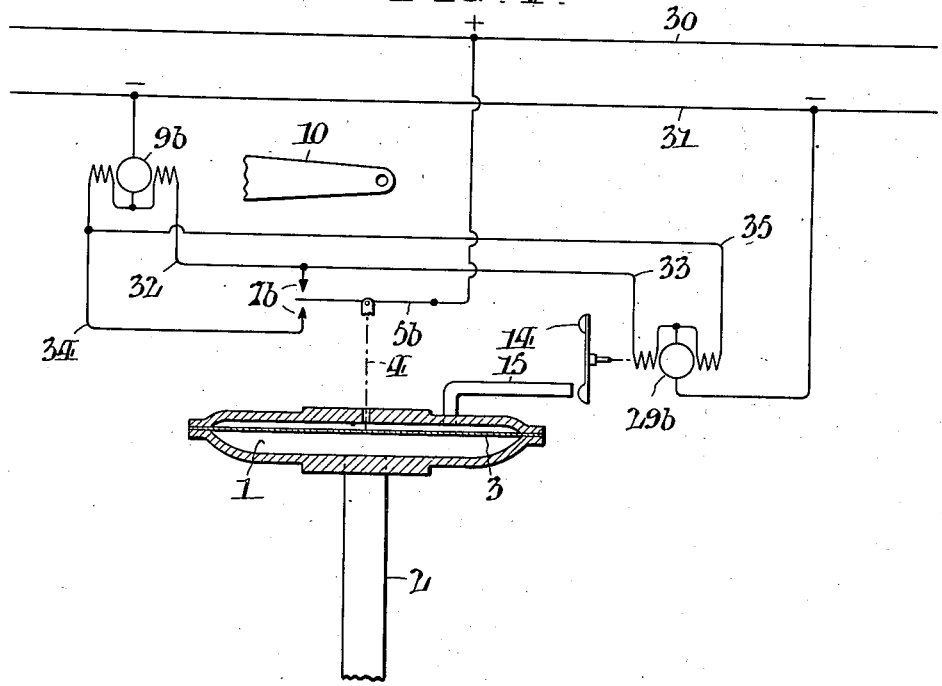
FIG. V.
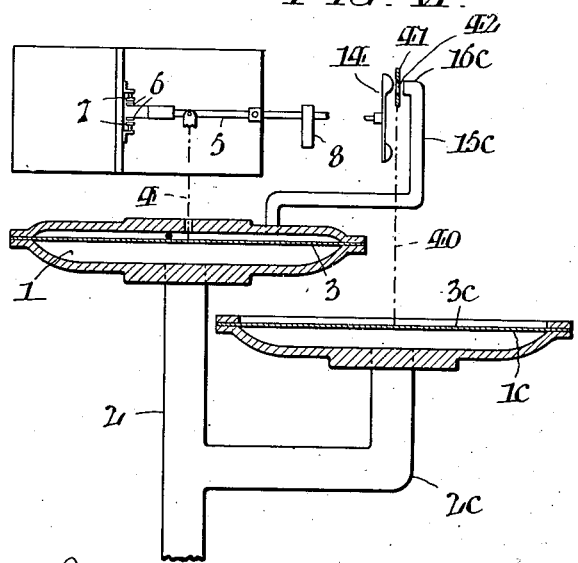
FIG. VI.
WITNESSES:
Thomas W. Kerr, Jr.
John A. Weidler
INVENTOR:
George A. Brooke, Jr.
BY Fraley Paul
ATTORNEYS.

Patented Mar. 9, 1937

2,073,332

UNITED STATES PATENT OFFICE 2,073,332

COMPENSATED CONTROL SYSTEM

George A. Brooke, Jr., Philadelphia, Pa., assignor to Brooke Engineering Company, Inc., Philadelphia, Pa., a corporation of Pennsylvania Application June 13, 1936, Serial No. 85,027

9 Claims. (Cl. 50—10)

This invention relates to compensated control systems and more particularly to a system for effecting compensation in such a way as to prevent overtravel and hunting.

In the operation of automatic control systems, difficulties arise due to the fact that an appreciable time interval occurs between the moment a correction is initiated and the moment when such a correction has a measurable effect upon the system being controlled. This time lag causes over-correction, sometimes termed "overtravel", and the resulting series of overtravels is responsible for a condition known as "hunting". This is a serious disadvantage since the control system is not in effective control during the time that it is hunting.

It has been found that hunting usually has its origin in too vigorous or overprolonged correction at a time when the system being controlled is approaching its normal or desired condition. It has been proposed to limit the sensitivity of the means utilized to initiate correction, and to this end springs and similar devices have been employed, but this introduces the disadvantage of rendering the control system sluggish when it should be most active, namely, when there is a large departure from normal in the system being controlled. Moreover, such systems have the disadvantage of inhibiting correction at the moment of departure from normal in the system being controlled, whereas the desired condition is one in which the control system will be quickly responsive as the system being controlled departs from normal but which will be increasingly less sensitive as the system being controlled is brought back to normal condition.

Therefore, the main object of this invention is to overcome the difficulties recited above by providing a control system which has a self-compensating factor adapted to inhibit correction as the system being controlled approaches normal.

Other objects and advantages of the invention, including those derived from the use of simple and inexpensive apparatus, will appear in the detailed description of a preferred embodiment thereof which follows, reference being had to the accompanying drawings, whereof:

Fig. I shows a plan view of a compensated control system embodying the invention.

Fig. II shows a side elevation of the compensated control system shown in Fig. I, with certain parts being broken away to show the interior construction of the pressure chamber.

Fig. III shows a plan view of a modification of the compensated control system shown in Fig. I, involving the addition of an automatic valve.

Fig. IV shows a side elevation of the compensated control system shown in Fig. III.

Fig. V is a diagrammatic view illustrating a second modification of the invention in which the compensating force is remotely controlled; and, Fig. VI is a view illustrating a third modification of the invention in which two pressure responsive diaphragms are employed.

With reference to Figs. I and II of the drawings, the apparatus illustrated comprises generally a primary control mechanism capable of functioning by itself as a regulator, and a secondary control mechanism which renders the primary control mechanism more efficient in its operation. While the apparatus of this invention may be applied to many different uses, it may be assumed that the pressure chamber 1 is connected by means of the pipe 2 with a furnace or the like, and that the diaphragm 3 in the chamber 1 moves in response to changes in furnace pressure. It may also be assumed that such movements of the diaphragm 3 cause the operating arm 10 to open and close a main control damper or like means, thus producing a corrective effect to restore the regulated medium to normal condition.

The primary control mechanism includes a link 4 connected at one end to the diaphragm 3 and connected at the other end to a balance arm 5. The balance arm 5 has thereon a pair of movable electric contacts 6 normally spaced from fixed contacts 7. A sliding weight 8 serves as a convenient means for adjusting the balance arm 5 and maintaining the contacts 6 and 7 out of engagement under normal conditions. The primary control mechanism also includes an electric motor 9, operated in one direction or the other depending upon which one of the fixed electrical contacts 7 is engaged, and a reduction gear, comprehensively designated at 11, through which a shaft 12 is driven at a greatly reduced speed as compared with that of the motor. The operating arm 10 is secured to the shaft 12.

Upon an increase of pressure in the chamber 1, the diaphragm 3 is urged upwardly, causing one of the movable contacts 6 on the balance arm 5 to engage the upper fixed contact 7. Under this condition the motor 9, through the reduction gears 11, drives the operating arm 10 in a direction such that the main control damper is moved towards a closed position, tending to shut off the supply of the pressure medium in the system to be regulated. In like manner when the pressure in the chamber 1 falls below the normal condition, the motor 9 operates in a reverse direction to cause a movement of the operating arm 10 which will move the main control damper towards fully open position, increasing the supply of the pressure medium in the system being controlled.

The secondary control mechanism comprises, generally, a fan 14 driven by the electric motor 9, and a pressure line 15 leading from the fan to the upper part of the pressure chamber 1. The fan 14 rotates in conformity with the rotation of the motor 9 and serves to produce a current of air which passes through an adjustable elbow 16 at the top of the pressure line 15 and down through the line into the pressure chamber 1. The secondary control mechanism thus creates a force upon the pressure responsive diaphragm 3 in opposition to the force which initiates movement of the diaphragm. For example, upon an increase of pressure in the lower part of the chamber 1, the fan 14 will produce a force at the top of the diaphragm opposing the force beneath it; and upon a decrease of pressure in the lower part of the chamber 1, the fan 14 will produce a suction in the line 15 which will tend to raise the diaphragm 3. Accordingly, if the initial impulse on the diaphragm 3 is very slight, as soon as the motor 9 commences to run the action of the fan 14 will cause the engagement between the movable and fixed contacts 6 and 7 to be broken at once, with consequent stopping of the motor. On the other hand, if the initial impulse is large, the pressure or suction caused by the operation of the fan 14 will not be sufficient to offset the force which has caused the initial movement of the diaphragm 3, and the movable and fixed contacts 6 and 7 will remain engaged. The motor 9 will continue to run until the pressure in the furnace, or the system being controlled, approaches the normal condition. As this normal condition is approached, a point is reached where the action of the fan 14 is sufficient to counteract the opposite force on the diaphragm 3, and cause the electrical contacts 6 and 7 to be broken, and the motor to stop. As the pressure medium continues to approach its normal condition, the fan 14 becomes more and more effective, and the speed of the motor 9 is gradually checked until the diaphragm 3 reaches its neutral position.

Desirably the fan 14 is spaced from the adjustable elbow 16 at a distance predetermined by trial and error, to produce the best results. Moreover, it will be observed that the fan operates in an open system as distinguished from a pump or other apparatus for creating air pressure which requires an increase in power as the pressure builds up. The fan 14 always runs at a constant speed, requires very little power to operate it, and attains its full speed immediately as soon as the motor 9 is energized.

In Figs. III and IV, there is represented a modification of the invention in which the primary control mechanism is substantially the same as represented in Figs. I and II, and the elements thereof are designated by similar reference numerals. The operating arm 10 is shown connected by means of a rod 18 and link 19 with a main control damper 20 located in the line 25 leading to the system being controlled. On the shaft 12 an additional arm 21 is secured, which is connected through a bar 22 with an arm 23. The arm 23 operates the stem 24 of a valve 26 located in the pressure line 15a of the secondary control mechanism. The pressure or suction created by the fan 14, in the line 15a, is varied automatically and continuously by the movement of the valve 26, in accordance with changes in the position of the operating arm 10. The use of this automatic adjustment serves to render the action of the fan 14 more effective. When the damper 20 is in the fully closed position, the valve 26 is in the fully open position, and vice versa, and thus when the primary control mechanism operates to produce the maximum corrective movement, the secondary control mechanism operates to produce a minimum checking force to counteract the same. Therefore, with the above modification, the regulating effect of the entire apparatus is greatest when the main control damper is nearly open.

In Fig. V, an additional modification is represented which is particularly adapted for use where the operating arm 10 is conveniently located at a distance from the pressure chamber 1. The balance arm of the primary control mechanism is represented diagrammatically at 5b, and the fixed contacts at 7b. Two electric motors are employed, one designated at 9b which is used for the primary control mechanism and which is situated remotely from the pressure chamber 1, and the other designated at 29b, which is used for the secondary control and is disposed close to the pressure chamber 1. The motors 9b, 29b are connected in parallel with electrical mains 30, 31. When the balance arm 5b is in raised position, current flows from the positive main 30 to the upper electrical contact 7b, and then divides, a portion flowing through conductor 32 and one field winding of the motor 9b to the negative main 31, and another portion flowing through conductor 33 and one field winding of the motor 29b, and thence to the negative main 31. On the other hand, when the balance arm 5b is in the lowered position, current flows from the positive main 30 through the lower contact 7b, and then divides, a portion flowing through conductor 34, to the other field winding of the motor 9b, and a portion flowing through conductor 35, to the other field winding of the motor 29b. The motor 9b actuates the operating arm 10, and the motor 29b actuates the fan 14. On account of the very low power required for actuation of the fan 14, the motor 29b can be very small in horse power rating. Where the operating arm 10 is to be remotely controlled, a great saving is effected through the use of such an auxiliary motor for the secondary control mechanism in lieu of the relatively expensive piping which would be otherwise needed for running the pressure line from the vicinity of the operating arm 10 to the vicinity of the pressure chamber 1.

In Fig. VI, a third modification of the invention is represented, which involves the use of an additional pressure chamber 1c and pressure responsive diaphragm 3c. To the auxiliary diaphragm 3c there is attached a link 40 which has at the end thereof a baffle 41 in the form of a vane interposed between the fan 14 and the pressure line 15c which leads to the main pressure chamber 1. The vane 41 moves in accordance with changes in the position of the diaphragm 3c, and is mounted in such a way that when the pressure medium in the chamber 1c is substantially at its normal condition, the elbow 16c is in registry with a hole 42 in the vane 41. On the other hand, when the pressure medium in the chamber 1c is at its maximum departure from normal condition, the movement upward or downward of the diaphragm 3c causes the solid portion of the vane 41 to move in front of the elbow 16c, so that there is complete obstruction to the passage of air from the fan 14 to the pressure line 15c. Intermediate positions of the vane 41 occur with intermediate conditions in the pressure chamber 1c. In this manner the pressure or suction created by the fan 14 in the pressure line 15c is varied automatically and continuously in conformity with changes in the condition of the medium being controlled.

While I have described one embodiment of this invention, and three different modifications thereof, it will be apparent that other modifications are contemplated, and that the secondary control mechanism may be varied to considerable extent to produce the desired results, all without departing from the spirit of the invention. It will also be apparent that the secondary control mechanism of this invention may be applied to many different forms of regulators, and that the apparatus illustrated herein is merely intended to represent a typical example of one form of regulator to which such mechanism may be advantageously applied.

Having thus described my invention, I claim:

1. In a compensated control system having a pressure chamber and an element therein responsive in its movement to changes in the condition of the medium to be regulated, a primary control mechanism actuated by the movement of said responsive element, said primary control mechanism including a source of power and means operated thereby for restoring the regulated medium to its normal condition, and a secondary control mechanism comprising a fan driven by said source of power and a pressure line leading from said fan to the pressure chamber aforesaid, said secondary control mechanism creating a force on said responsive element in opposition to the force initiating a movement thereof.

2. In a compensated control system having a pressure chamber and an element therein responsive in its movement to changes in the condition of the medium to be regulated, a primary control mechanism actuated by the movement of said responsive element, said primary control mechanism including a reversible electric motor and means operated thereby for restoring the regulated medium to its normal condition, and a secondary control mechanism comprising a fan driven by said electric motor and a pressure line leading from said fan to the pressure chamber aforesaid, said secondary control mechanism creating a force on said responsive element in opposition to the force initiating a movement thereof.

3. In a compensated control system having a pressure chamber and a diaphragm therein responsive in its movement to changes in the condition of the medium to be regulated, a primary control mechanism actuated by the movement of said diaphragm, said primary control mechanism including an electric motor, means whereby changes in the position of said diaphragm effect starting and stopping of said motor, and means operated by the motor for restoring the regulated medium to its normal condition, and a secondary control mechanism comprising a fan driven by said motor and a pressure line leading from said fan to the pressure chamber aforesaid, said secondary control mechanism creating a force on said diaphragm in opposition to the force initiating a movement thereof.

4. In a compensated control system having a pressure chamber and an element therein responsive in its movement to changes in the condition of the medium to be regulated, a primary control mechanism actuated by the movement of said responsive element, said primary control mechanism including a source of power and means operated thereby for restoring the regulated medium to its normal condition, and a secondary control mechanism comprising a fan driven by said source of power and a pressure line in open communication with said fan and leading from the fan to the pressure chamber aforesaid, said fan serving to create pressure or suction, depending upon its direction of rotation, in the pressure line, and thus to produce a force on the responsive element in opposition to the force initiating a movement thereof.

5. In a compensated control system having a pressure chamber and a diaphragm therein responsive in its movement to changes in the condition of the medium to be regulated, a primary control mechanism actuated by the movement of said diaphragm, said primary control mechanism including a reversible electric motor and means operated thereby for restoring the regulated medium to its normal condition, and a secondary control mechanism comprising a fan driven by said electric motor and a pressure line having an open end spaced in advance of said fan and its other end terminating at said pressure chamber, said secondary control mechanism creating a force on said diaphragm in opposition to the force initiating a movement thereof.

6. In a compensating control system having a pressure chamber and an element therein responsive in its movement to changes in the condition of the medium to be regulated, a primary control mechanism actuated by the movement of said responsive element, said primary control mechanism including a source of power and means operated thereby for restoring the regulated medium to its normal condition, and a secondary control mechanism comprising a fan driven by said source of power, a pressure line leading from said fan to said pressure chamber, and a valve in said pressure line, said secondary control mechanism creating a force on said responsive element in opposition to the force initiating a movement thereof, and said valve being actuated automatically by the aforesaid means for restoring the regulated medium to its normal condition.

7. In a compensated control system having a pressure chamber and an element therein responsive in its movement to changes in the condition of the medium to be regulated, a primary control mechanism actuated by the movement of said responsive element, said primary control mechanism including a source of power, and a main control valve operated thereby for restoring the regulated medium to its normal condition, and a secondary control mechanism comprising a fan driven by said source of power, a pressure line leading from said fan to said pressure chamber, and a valve in said pressure line, said secondary control mechanism creating a force on said responsive element in opposition to the force initiating a movement thereof, and said valve in said pressure line being automatically movable from open to closed position in accordance with reverse movements of the main control valve.

8. In a compensated control system having a pressure chamber and an element therein responsive in its movement to changes in the condition of the medium to be regulated, a primary control mechanism actuated by the movement of said responsive element, said primary control mechanism including an electric motor situated remotely from said pressure chamber, and means operated by said motor for restoring the regulated medium to its normal condition, and a secondary control mechanism comprising an auxiliary electric motor situated in proximity to said pressure chamber, a fan driven by said auxiliary motor, and a pressure line leading from said fan to the pressure chamber aforesaid.

9. In a compensated control system having a pressure chamber and a diaphragm therein responsive in its movement to changes in the condition of the medium to be regulated, a primary control mechanism actuated by the movement of said diaphragm, said primary control mechanism including an electric motor and means operated thereby for restoring the regulated medium to its normal condition, and a secondary control mechanism comprising a fan driven by said motor, a pressure line leading from said fan to the pressure chamber aforesaid, an auxiliary pressure chamber having an auxiliary diaphragm therein responsive in its movement to changes in the condition of the medium to be regulated, and a baffle operated by said auxiliary diaphragm, said baffle being interposed between the fan and pressure line.

GEORGE A. BROOKE, Jr.